United States Patent

Honma et al.

[11] Patent Number: 5,971,912
[45] Date of Patent: Oct. 26, 1999

[54] FLUID FLOW CONTROLLING DEVICE AND AN INCUBATOR INCORPORATING THE SAME THEREIN

[75] Inventors: Naoki Honma, Urawa; Shinichi Kobayashi, Tokyo; Keisuke Wakabayashi, Urawa; Kazuo Matubara, Tokyo, all of Japan

[73] Assignee: Atom Medical Corporation, Tokyo, Japan

[21] Appl. No.: 08/787,905

[22] Filed: Jan. 23, 1997

[30] Foreign Application Priority Data

Jan. 31, 1996 [JP] Japan .................................... 8-037288

[51] Int. Cl.$^6$ .................................................. A61G 11/00
[52] U.S. Cl. .............................................. 600/22; 137/100
[58] Field of Search ........................ 600/21, 22; 137/100, 137/98, 118.02

[56] References Cited

U.S. PATENT DOCUMENTS

| | | | |
|---|---|---|---|
| 2,682,276 | 6/1954 | Fraser | 137/100 |
| 4,481,938 | 11/1984 | Lindley | 600/22 |
| 5,261,452 | 11/1993 | McAndrew et al. | 137/100 |
| 5,544,674 | 8/1996 | Kelly | 137/98 |

*Primary Examiner*—Linda C. M. Dvorak
*Assistant Examiner*—Rosiland Kearney
*Attorney, Agent, or Firm*—Woodcock Washburn Kurtz Mackiewicz & Norris LLP

[57] ABSTRACT

A fluid flow controlling device having a working member capable of reciprocating in a tubular case. The working member comprises a pressure detecting portion to detect the pressure of a second fluid, which flows into the tubular case through a second inlet, and to move the working member forwards; and a valve element to decrease the opening of the first outlet in relation to the opening of the first inlet, through which the first fluid is led into the tubular case, in correspondence with the displacement of the working member. By the use of the above fluid flow controlling device, it becomes easy to control the quantity of the first fluid led into the tubular case in relation to that of the second fluid, and it becomes possible to sufficiently supplying the first fluid to the tubular case even when the second fluid is exhausted and cannot be supplied any more so long as the first fluid is not exhausted. Further, the above fluid flow controlling device has a simple structure, performs a reliable action, does not break easily, and is very durable.

12 Claims, 13 Drawing Sheets

FIG.6
FIG.7
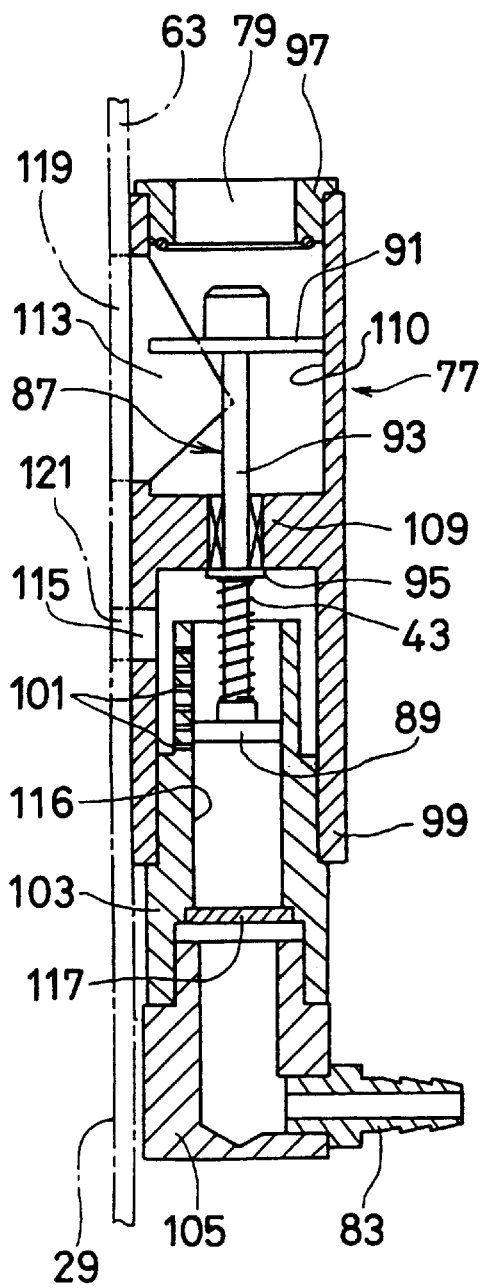
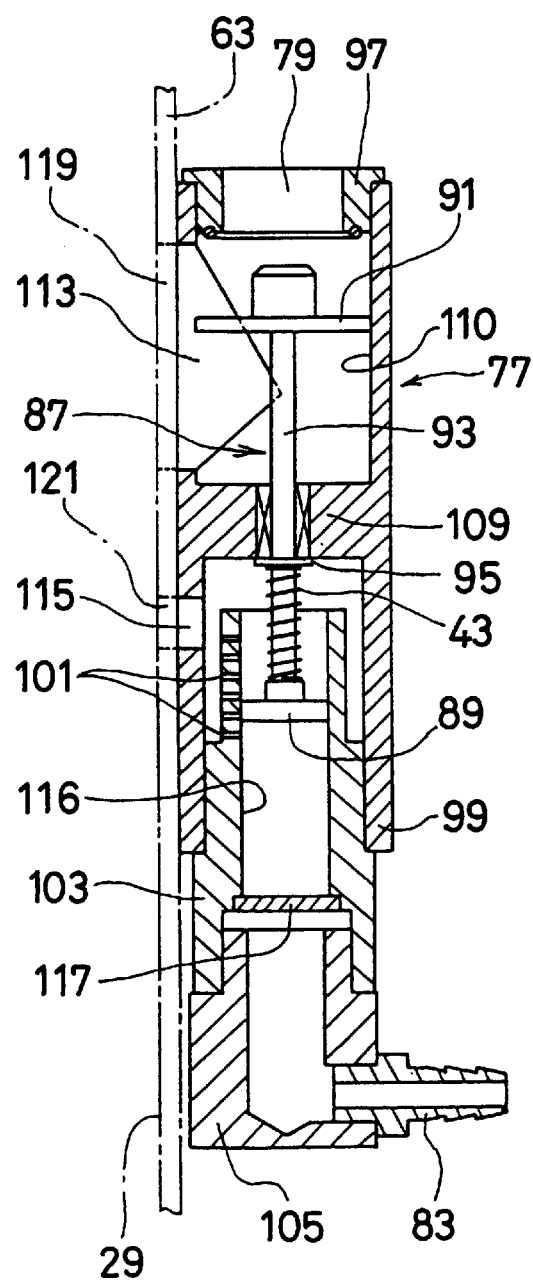

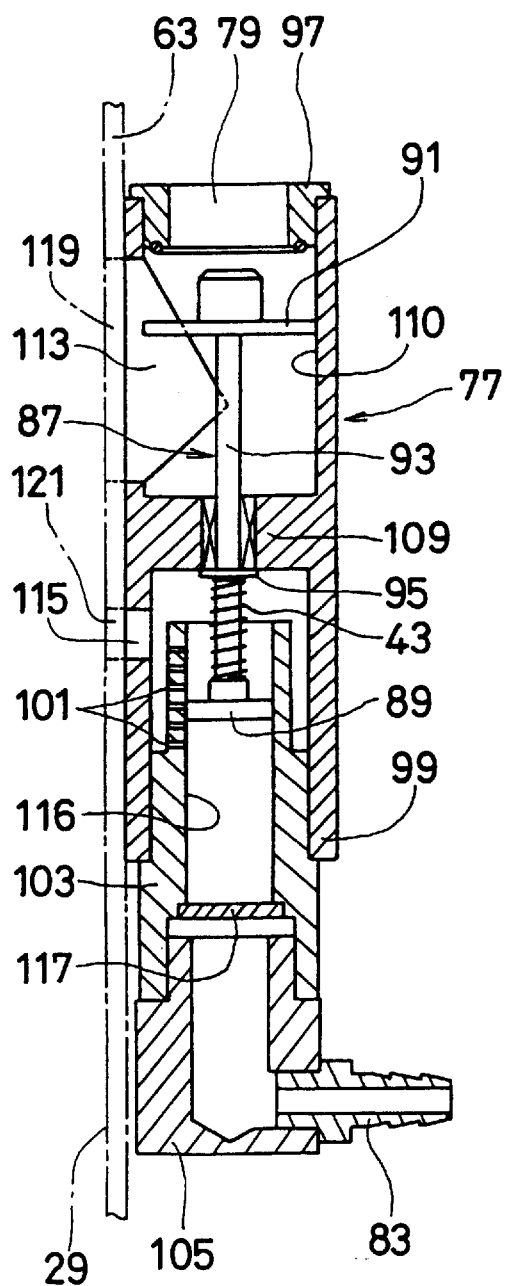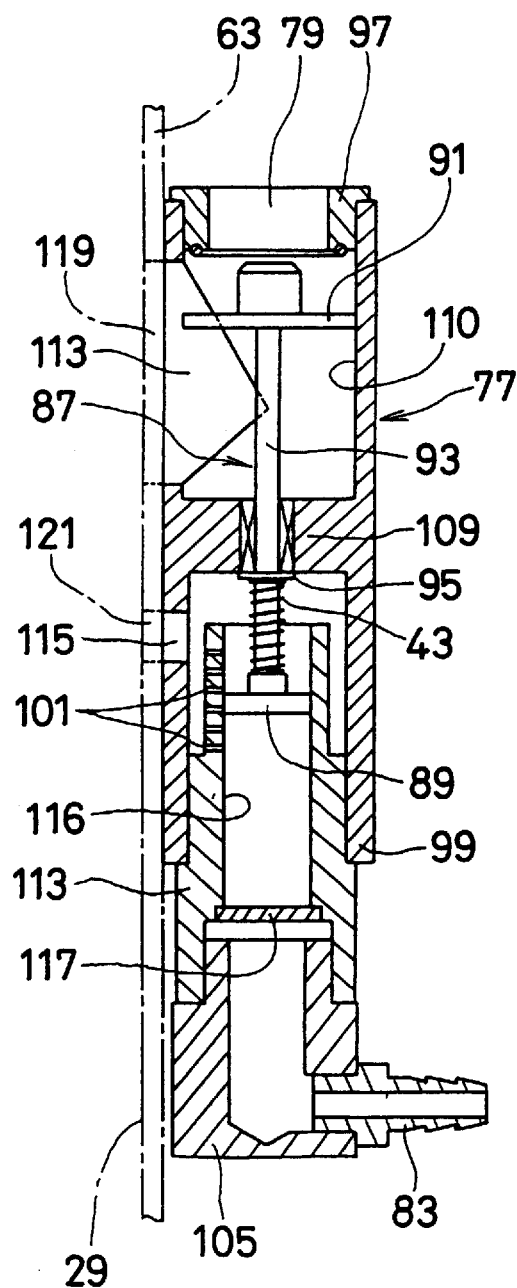

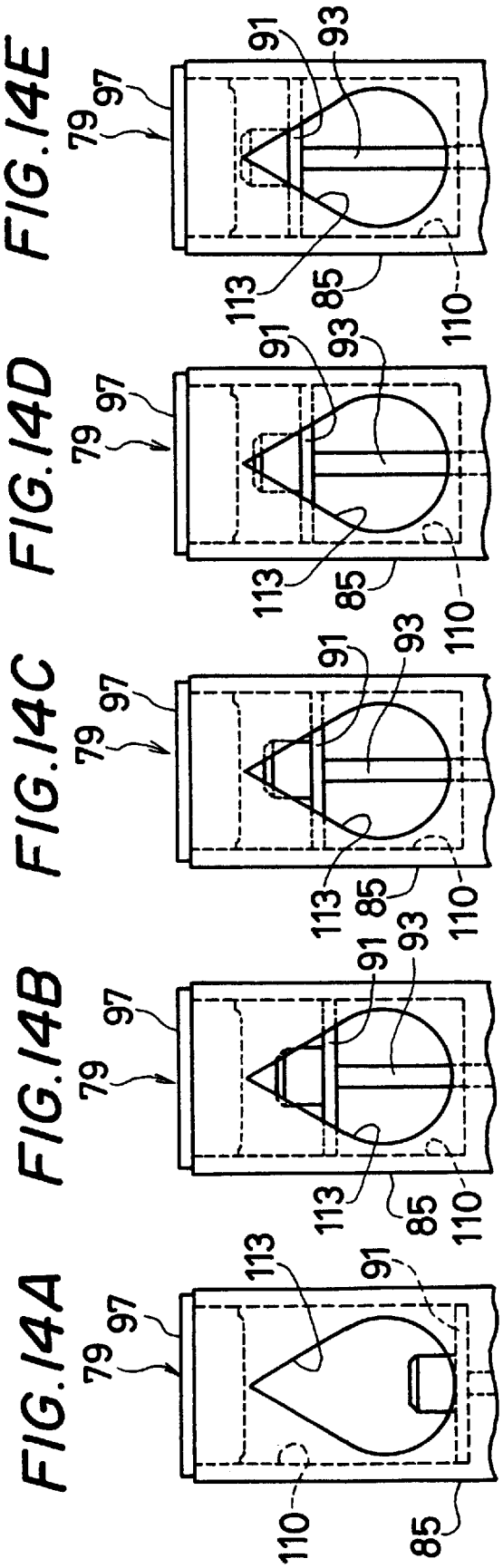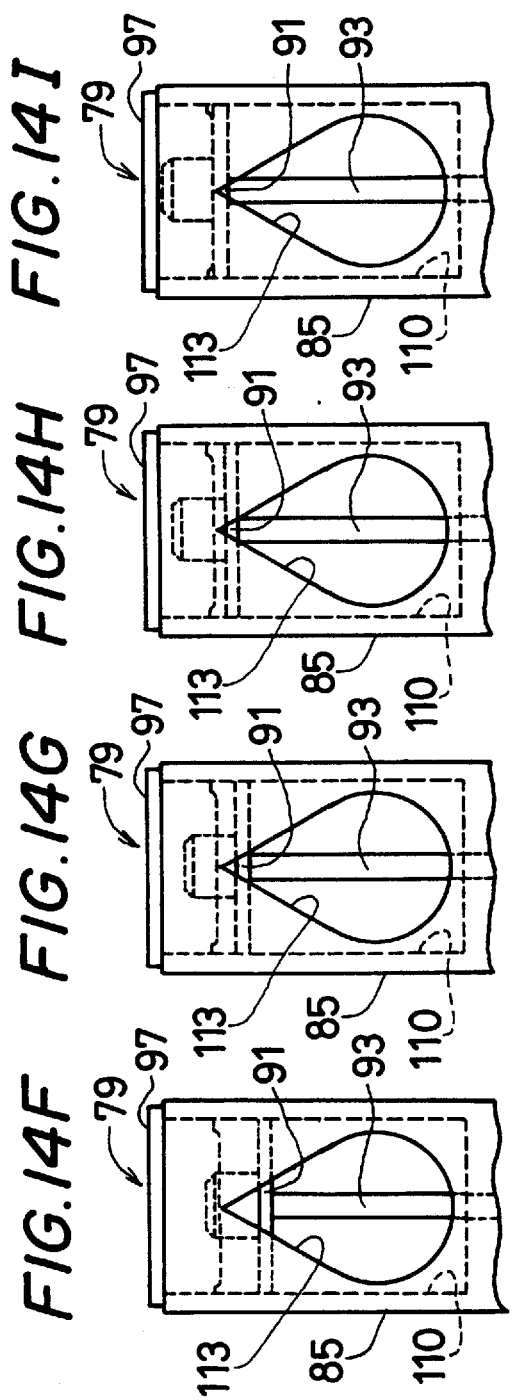

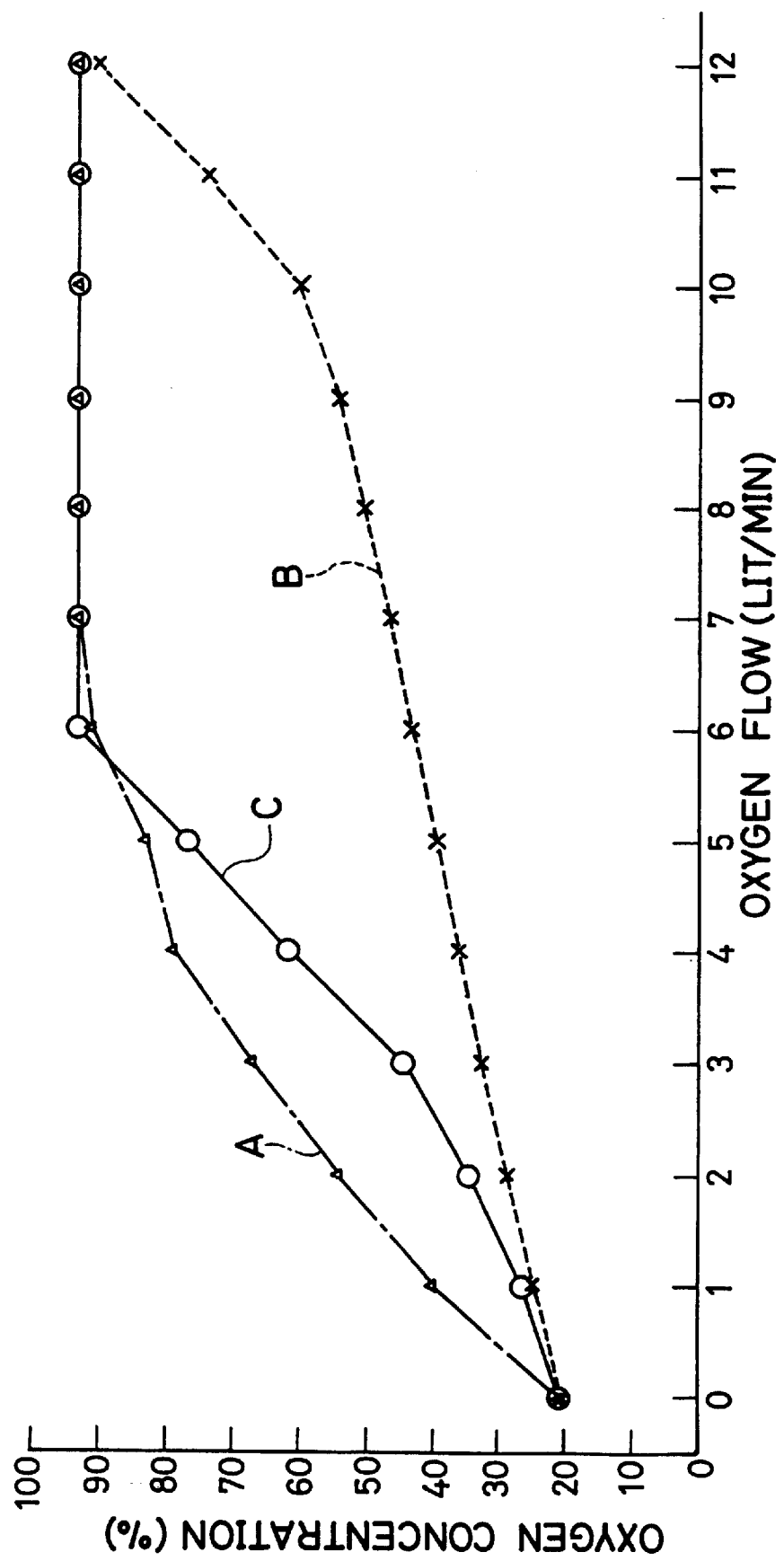

FLUID FLOW CONTROLLING DEVICE AND AN INCUBATOR INCORPORATING THE SAME THEREIN

TECHNICAL FIELD

This invention relates generally to a fluid flow controlling device capable of controlling the respective flow rates of plural fluids (for example, oxygen and air) in machines or instruments, such as an incubator, and particularly, but not exclusively, to an incubator incorporating such a fluid flow controlling device.

BACKGROUND OF THE INVENTION

An incubator capable of providing a controlled environment for a weak or sickly neonate like an immature infant has generally a conditioned-air supplying device whose temperature, humidity, oxygen content and so forth have been conditioned. In order to purify, with a filter, both the air of a space where an incubator is set, for example, a ward of an obstetrics and gynecology hospital (hereinafter described as "the outside air") and, if necessary, the oxygen supplied from an oxygen bomb (hereinafter described as "the supplied oxygen") and in order to supply them to the hood of the incubator, the conditioned-air supplying device of this type generally has a filter mounting apparatus of mounting the filter on the base of the incubator.

Shown in FIGS. 15–17 is one example of conventional fluid flow controlling device of the incubator (hereinafter described as "the first former example"). In FIGS. 15–17, the fluid flow controlling device is in a state of being incorporated in the filter mounting apparatus of an incubator, so that the filter mounting apparatus as well as the fluid flow controlling device will be explained on reference to FIGS. 15–17.

In the filter mounting apparatus shown in FIGS. 15–17, the bottom plate portion 4 of a box-like filter accommodating case 7 is fixed to the back wall portion 3 of a base 1 with a pair of right and left stud bolts 9, 11. On the upper side of the base 1, a neonate's support (not shown) is provided and, in the filter accommodating case 7, a stepped portion 6 of substantially rectangular shape is formed along the outer periphery of the bottom plate portion 4. Further, a small gas passage aperture 5 is provided in the bottom plate portion 4. The base 1 has a transparent hood (not shown) that covers the neonate lying on the neonate receptacle which is disposed in the upper portion of the base 1. The base 1 is generally put on a table (not shown), on which the incubator is set. In the back wall portion 3 of the base 1, a gas passage aperture 8 is provided in correspondence with the gas passage aperture 5 of the filter accommodating case 7.

As shown in FIGS. 15 and 16, the stud bolts 9, 11 project from the back wall portion 3 of the base 1 into the filter accommodating case 7 and are inserted into a pair of right and left apertures 15, 17 of an air filter 13, which is made of nonwoven pad or the like, so that the air filter 13 is accommodated in the filter accommodating case 7 in such a state that its substantially rectangular outer periphery abuts against the stepped portion 6. The side portion of a vessel-like filter cover 19 is fitted into the side wall of the filter accommodating case 7 so that the outer periphery of the air filter 13 is pressed against the stepped portion 6 by a pressing portion 19a formed by bending the distal end of the filter cover 19 and arranged in opposed relation to the stepped portion 6.

As shown in FIG. 16, rotatably mounted on the filter cover 19 is a pair of right and left clamp devices 23, 25, in each distal end portion of which box nut portion 23a, 25a is formed. When the pair of clamp devices 23, 25 are rotated by hand, each box nut portion 23a, 25a is screwed on the distal end of each corresponding stud bolt 9, 11. Thus, the filter cover 19 fitted into and fixed to the filter accommodating case 7 against the elastic force of the air filter 13 presses the outer periphery of the air filter 13 with its pressing portion 19a against the stepped portion 6 of the bottom plate portion 4 of the filter accommodating case 7, so that the air filter 13 is fixed to the stepped portion 6. As a result of the foregoing, a pre-filter chamber 29 is formed between the air filter 13 and the front plate portion 19b of the filter cover 19 and a post-filter chamber 30 is formed between the air filter 13 and the bottom plate portion 4 of the filter accommodating case 7.

Provided on the filter cover 19 is a flow controlling mechanism 31, whereby the outside air and the supplied oxygen are led into the pre-filter chamber 29 through a gas inlet 27 formed in the front plate portion 19b of the filter cover 19. As shown in FIGS. 17A and 17B, the flow controlling device 31 has a blockish body 35 fixed to the front plate portion 19b of the filter cover 19. The blockish body 35 has an air inlet 33 provided in correspondence with the gas inlet 27 formed in the front plate portion 19b of the filter cover 19. Further, fixedly mounted in the blockish body 35 is a connecting pipe 39, to which the distal end of an oxygen supplying pipe 37 is connected. The pipe 37 leads oxygen from an oxygen bomb (not shown). It is noted that the oxygen supplying pipe 37 communicates with the air inlet 33 through a connecting pipe 39. An air valve body 41 is mounted on the blockish body 35 through its shaft portion 41a so as to be movable back and forth, and urged toward its retreated position due to the force of a coiled spring 43, so that the air inlet 33 is to be closed in the front end portion thereof by the air valve body 41. The front end portion serves as a valve seat.

At ordinary time (including the time not in use), a marker panel 45 is mounted on the flow controlling device 31. The marker panel 45 is substantially flat and has a slotted portion 45a extending from its lower end. Further, a short horizontal plate portion 45b with an engaging aperture 47 projects from the center of the back surface of the marker panel 45.

When the filter mounting apparatus shown in FIGS. 15–17, in which the flow controlling device 31 is incorporated, is used at ordinary time, it should be performed beforehand as shown in FIG. 17A to insert the lower end of the marker panel 45 between the air valve body 41 and the blockish body 35 of the flow controlling device 31; to fit the shaft 41a of the air valve body 41 into the slotted portion 45a; and to fit a projection 35a protruding from the blockish body 35 into the engaging aperture 47. It is noted that at ordinary time, the air valve body 41 is in its advanced position and is apart from the front end of the air inlet 33, so that the air inlet 33 serves to communicate the pre-filter chamber 29 with the outside.

Therefore, when the air circulating fan (not shown) of the conditioned-air supplying device disposed within the base 1 is driven, the outside air is led into the pre-filter chamber 29 through the air inlet 33 and the gas inlet 27. If necessary, the valve of the oxygen bomb (not shown) will be opened in a suitable degree. In that event, the supplied oxygen from the oxygen bomb is led into the air inlet 33 through the oxygen supplying pipe 37 and the connecting pipe 39 and, then, led into the pre-filter chamber 29 together with the above outside air. As the result, the air suitably enriched with the supplied oxygen whose quantity depends upon the opening rate of the valve flows from the pre-filter chamber 29 to the air circulating fan (not shown) through the air filter 13, the post-filter chamber 30 and the gas passage apertures 5, 8. Thus, the air is purified due to the air filter 13.

However, in a state of ordinary use shown in FIG. 17A, if the valve of the oxygen bomb is fully opened to supply a flow of 15 lit/min for example, the air also flows into the pre-filter chamber 29 through the air inlet 33 and the gas inlet 27, so that it is difficult to get high concentration of oxygen in the air (that is, the air enriched with the supplied oxygen) taken in the hood of the incubator and, in the example shown in FIG. 17A, the concentration is about 40% at the utmost if the flow of the supplied oxygen is 15 lit/min.

In the meantime, if the neonate lying on the neonate's receptacle is in an abnormal state, it will be required to supply much oxygen to the hood of the incubator. In such case, the valve of the oxygen bomb is fully opened and the marker panel 45 is disengaged from the blockish body 35 of the flow controlling device 31. As the result, the air valve body 41 retreats due to the force of the coiled spring 43, so that the front portion of the air inlet 33 is blocked up as shown in FIG. 17B. Thus, the outside air is not led into the pre-filter chamber 29 and only the supplied oxygen is led into the pre-filter chamber 29.

However, in the first former example, shown in FIGS. 15–17, of the flow controlling device 31, when the state of ordinary use shown in FIG. 17A is changed to the state of extraordinary use shown in FIG. 17B, in which the neonate is in the abnormal state, it is required that not only the valve of the oxygen bomb is fully opened, but also the marker panel 45 is disengaged from the blockish body 35 of the flow controlling device 31. On the contrary, when the state of extraordinary use is changed to the state of ordinary use, it is required that not only the valve of the oxygen bomb is closed by a certain degree or completely, but also the marker panel 45 is engaged with the the blockish body 35 of the device 31. Further, when the oxygen bomb empties in the state of extraordinary use, in which the neonate is in the abnormal state, not only the supplied oxygen but also the outside air are not led into the pre-filter chamber 29 because of the blockade of the air inlet 33. In addition, broken-line A shown in FIG. 19, which represents the relationship, in the state of extraordinary use, between the oxygen flow from the oxygen bomb and the oxygen concentration in the air (that is, the air enriched with the supplied oxygen) within the hood of the incubator, has steep gradient at its initial stage because the air inlet 33 has been blocked up, so that the fine control of the oxygen concentration is difficult.

Shown in FIG. 18 is another example of the conventional fluid flow controlling devices of the incubator previously stated (hereinafter described as "second former example"). In FIG. 18, the fluid flow controlling device is in a state of being located adjacent to the filter mounting apparatus of the incubator, so that the filter mounting apparatus as well as the fluid flow controlling device will be explained on reference to FIGS. 18A and 18B. Further, the same reference numerals will be used for the members common between the first former example shown in FIGS. 15–17 and the second former example shown in FIGS. 18A and 18B, and the explanation for each common member will be omitted.

In the fluid flow controlling device 31 shown in FIGS. 18A and 18B, a connecting pipe 39, to which the distal end of the oxygen supplying pipe 37 for supplying the supplied oxygen from the oxygen bomb (not shown) is connected, is fixed to the back wall portion 3 of the base 1 and projects outwards therefrom. On the upper side of the base 1, a neonate's support (not shown) is provided. A bellowslike conduit 51 made of elastic material such as silicon rubber and having a front plate portion 51a fixed to the back wall portion 3 is arranged in a first inner space 52 formed on the inside of the the back wall portion 3 so as to be in alignment with the connecting pipe 39. Further, provided in the base 1 is a partition board 53 extending substantially in parallel with the back wall portion 3 and, in the partition board 53, a gas inlet 27 formed in the shape of a circular truncated cone is provided so as to be substantially in alignment with the connecting pipe 39. In the rear plate portion 51b of the bellowslike conduit 51, a projection 51c that has substantially the same shape as the gas inlet 27 (that is, the shape of the circular truncated cone) is formed integrally with the rear plate portion 51b so as to be substantially in alignment with the connecting pipe 39, and an oxygen outlet 55 is formed through the central portion of the projection 51c. Further, a coiled spring 43 lies between the rear plate portion 51b of the bellowslike conduit 51 and the partition board 53 so as to be substantially in alignment with the connecting pipe 39.

In the second inner space 54 formed on the inside of the partition board 53 of the base 1, an air filter 13 is arranged substantially in parallel with the partition board 53 and, between the air filter 13 and the partition board 29, a pre-filter chamber 29 is formed. Further, on the inside of the air filter 13, a post-filter chamber 30 is formed.

When the fluid flow controlling device 31 and the filter mounting apparatus shown in FIGS. 18A and 18B are to be used in the state of ordinary use, the air circulating fan (not shown) of the conditioned-air supplying device should be driven under the condition illustrated in FIG. 18A. As the result, the air led into the first inner space 52 of the base 1 through an outside air inlet (not shown) formed in the back wall portion 3 of the base 1 is supplied to the pre-filter chamber 29 via the outside of the bellows conduit 51 and through the gas inlet 27.

If the valve of the oxygen bomb (not shown) is opened in a necessary degree, the supplied oxygen from the oxygen bomb is led into the bellowslike conduit 51 through the oxygen supplying pipe 37 and the connecting pipe 39 and successively led into the pre-filter chamber 29 through the oxygen outlet 55, via a part of the first inner space 52 and through the gas inlet 27. In that event, the rear plate portion 51b of the bellowslike conduit 51 moves rearwards (toward the left in FIG. 18A) in correspondence with the degree of the valve opening, due to the pressure of the supplied oxygen led into the inside of the bellowslike conduit 51, and against the force of the coiled spring 43, so that the bellowslike conduit 51 extends and the projection 51c approaches the gas inlet 27. Thus, the flow of the outside air passing through the outside of the bellowslike conduit 51 and led into the pre-filter chamber 29 is reduced in correspondence with the degree of the approximation of the projection 51c to the gas inlet 27.

As a result of the foregoing, the air within the pre-filter chamber 29 and enriched with the suitable quantity of the supplied oxygen, which depends upon the degree of the valve opening, moves toward the air circulating fan (not shown) through the air filter 13 and the post-filter chamber 30, so that the air is purified by the air filter 13.

In the meantime, when the fluid flow controlling device 31 and the filter mounting apparatus are used in the state of extraordinary use, in which the neonate is in the abnormal state, the valve of the oxygen bomb is fully opened, so that a large quantity of the supplied oxygen is led into the inside of the bellowslike conduit 51 and, due to the pressure of the supplied oxygen, the rear plate portion 51b of the bellowslike conduit 51 moves rearwards against the force of the coiled spring 43 until the projection 51c is fitted into the gas inlet 27 and the two touch completely. Thus, the flow of the outside air is intercepted between the outside of the bellowslike conduit 51 and the pre-filter chamber 29. In other words, the air is not led into the pre-filter chamber 29 via the outside of the bellowslike conduit 51 and only the supplied oxygen is led into the pre-filter chamber 29.

However, in the second former example 31 of conventional fluid flow controlling devices shown in FIGS. 18a and 18B, the bellowslike conduit 51 of elastic material such as silicon rubber is a requisite member and it must expand and contract in correspondence with the flow of the supplied oxygen. However, the correspondence often breaks down because the expansion and contraction characteristic of the bellowslike conduit 51 varies with every product and the conduit 51 does not always act smoothly. Further, the bellowslike conduit 51 is apt to be damaged for the duration of the long-term use. In addition, the bellowslike conduit 51 must expand against the force of the coiled spring 43 as the flow of the supplied oxygen increases, but the inclination of the expansion of the bellowslike conduit 51 to the flow of the supplied oxygen is gentle, so that broken-line B shown in FIG. 19, which represents the relationship between the flow of the supplied oxygen and the oxygen concentration in the air within the hood to the incubator, has a gentle gradient substantially over its whole range. Further, a part of the supplied oxygen within the bellowslike conduit 51 is apt not to flow into the gas inlet 27 via the oxygen outlet 55 but to leak through to the outside of the bellowslike conduit 51 and, as the result, the supplied oxygen is apt to be wasted.

SUMMARY OF THE INVENTION

Accordingly, it is a main object of the present invention to provide a fluid flow controlling device capable of easily controlling the quantity of a first fluid, which is to be led into a tubular case, in relation to that of a second fluid, which is also to be led into the tubular case and, further, capable of sufficiently supplying the first fluid to the cylindrical case if the second fluid is exhausted and can not be supplied any more, so long as the first fluid is not exhausted.

Another object of the invention is to provide a fluid flow controlling device having a simple structure, performing a reliable action, not breaking easily, and being very durable.

A fluid flow controlling device according to this invention comprises a tubular case and a working member capable of relative reciprocation in the tubular case. The tubular case has a first inlet for leading a first fluid into the tubular case; a second inlet for leading a second fluid into the tubular case; a first outlet for flowing the first fluid, which is led into the tubular case from the first inlet, outside from the tubular case; and a second outlet for flowing the second fluid, which is led into the tubular case from the second inlet, outside from the tubular case. The working member comprises a pressure detecting portion to detect the pressure of the second fluid, which flows into the tubular case through the second inlet, and to move the working member forwards; and a valve element to decrease the opening of the first outlet in relation to the opening of the first inlet in correspondence with the displacement of the working member. Further, the second fluid, which is led into the tubular case through the second inlet, is led outside through the second outlet, and the first fluid, which is led into the tubular case through the first inlet, is led outside through the first outlet under condition such that the flow of the first fluid led into the tubular case through the first inlet decreases as the flow of the second fluid increases and, thereby, the opening of the first outlet decreases.

The above, and other, objects, features and advantages of the present invention, will become readily apparent from the following detailed description thereof which is to be read in connection with the accompanying drawings.

BRIEF DESCRIPTION OF THE DRAWINGS

FIG. 6 is a sectional view similar to FIG. 5, at the time when the flow of the supplied oxygen is 1 lit/min;

FIG. 7 is a sectional view similar to FIG. 5, at the time when the flow of the supplied oxygen is 2 lit/min;

FIG. 8 is a sectional view similar to FIG. 5, at the time when the flow of the supplied oxygen is 3 lit/min;

FIG. 9 is a sectional view similar to FIG. 5, at the time when the flow of the supplied oxygen is 4 lit/min;

FIGS. 14A–14I are front views of an outside air outlet of the fluid flow controlling device shown in FIG. 4 and its circumference, in which the outside air outlet changes from its opened state to its closed state in correspondence with each state of the oxygen flows illustrated in FIGS. 5–13;

FIG. 19 is a graphical representation of the relationship between the flow of supplied oxygen and the oxygen concentration in case of the embodiment of this invention shown in FIGS. 1–14, the first former example shown in FIGS. 15–17, and the second former example shown in FIGS. 18A and 18B.

DETAILED DESCRIPTION OF THE INVENTION

Figure 1:
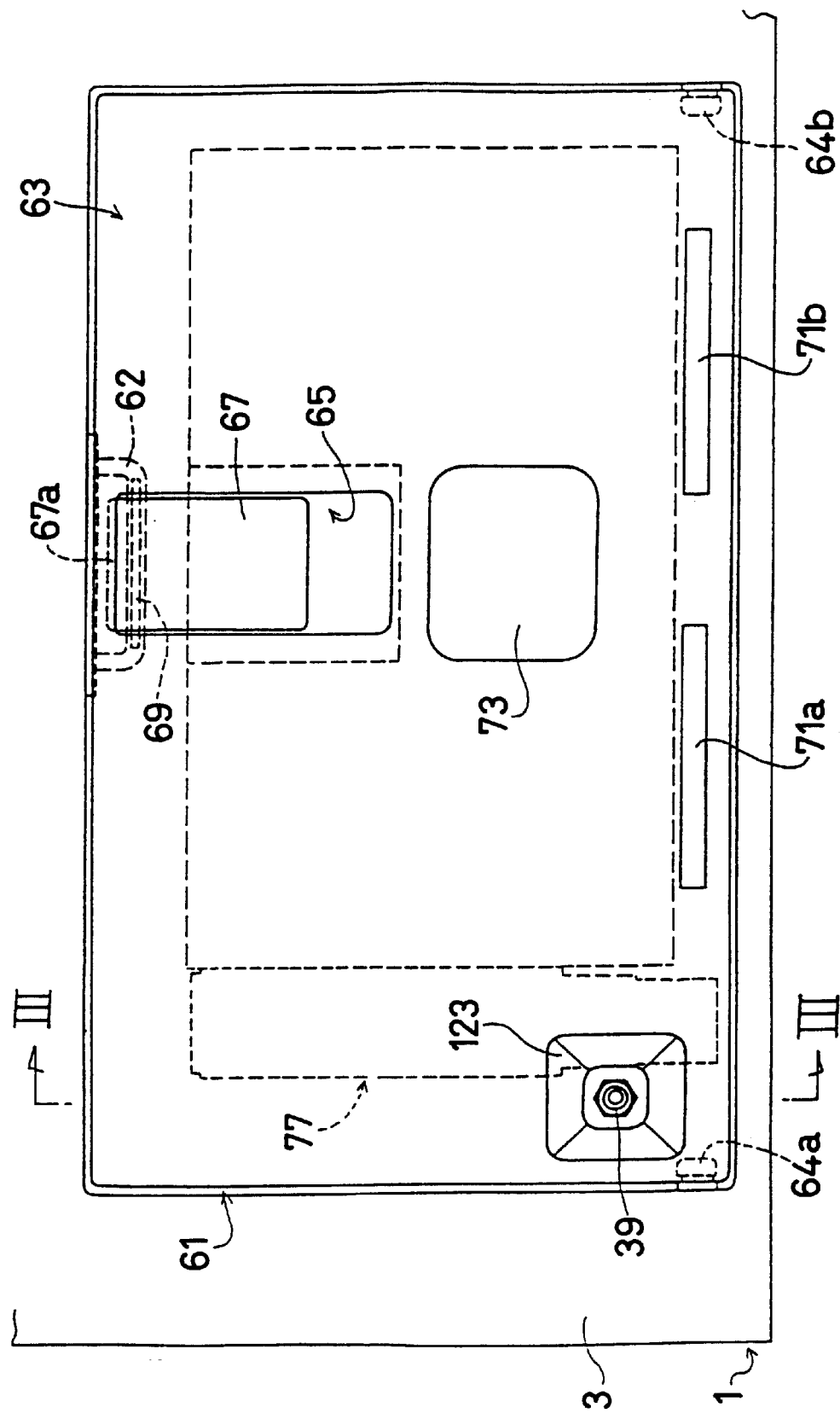
FIG. 1 is a front view of a filter mounting apparatus of an incubator in which a fluid flow controlling device according to an embodiment of this invention is in incorporated.

Referring to FIGS. 1—14, an embodiment of a fluid flow controlling device in accordance with this invention, which is incorporated in the filter mounting apparatus of an incubator, will be hereinafter described. In between the device shown in FIGS. 1–14 and the devices shown in FIGS. 15–18, the same reference numerals will be used to identify the same members.

Figure 2:
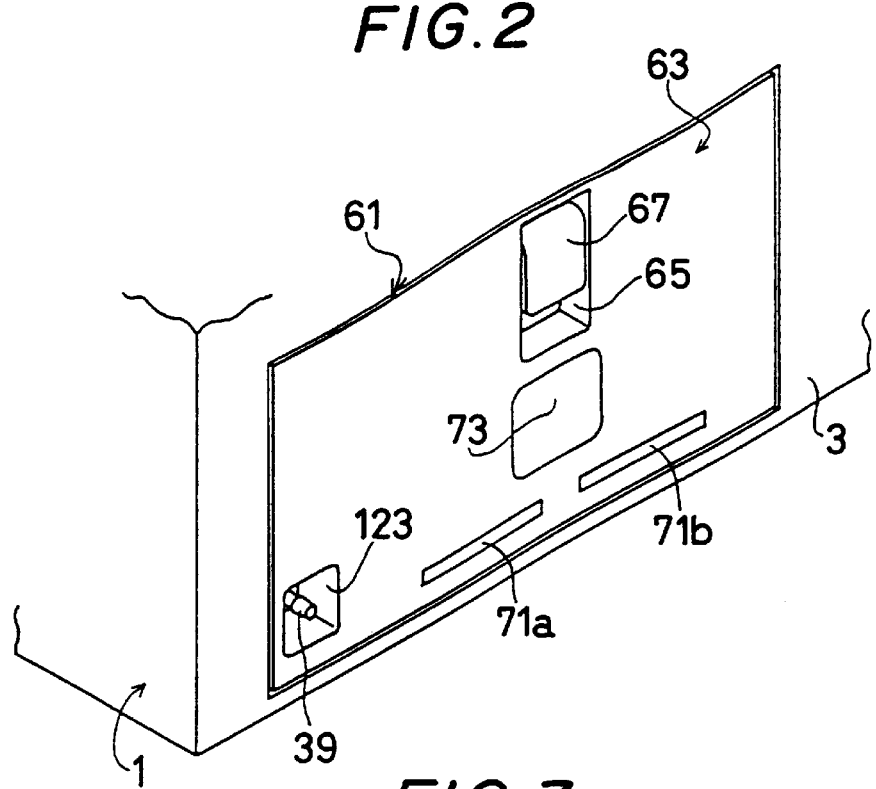
FIG. 2 is a perspective view of the filter mounting apparatus shown in FIG. 1.
Figure 3:
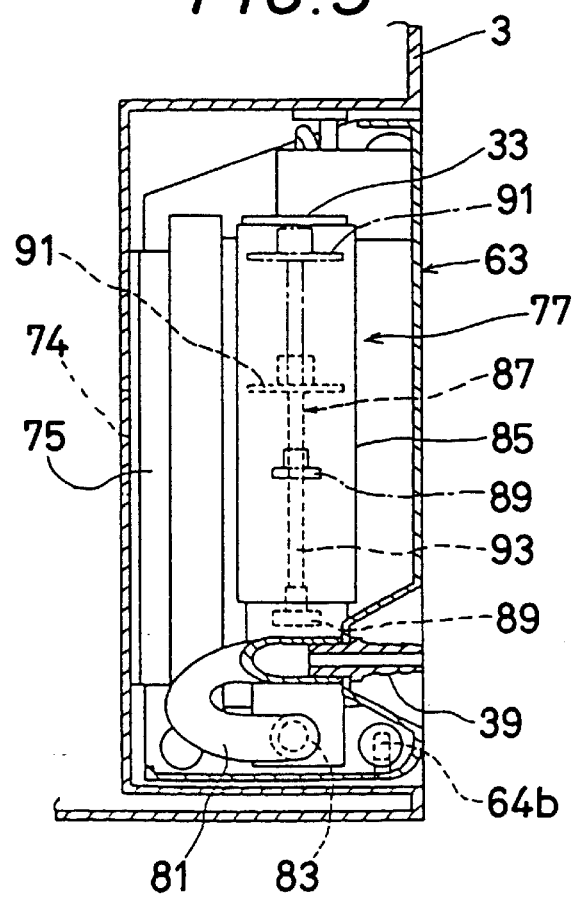
FIG. 3 is a sectional view taken along the line III—III on FIG. 1.

The filter mounting apparatus shown in FIGS. 1–3 has an inhaled-gas controlling space 61 of substantially rectangular parallelepipedic shape, which is formed in the back wall portion 3 of a base 1. To the upper wall portion of the controlling space 61, a U-shaped engaging bar 62 is fixed and a pair of right and left shafts 64a, 64b are rotatably mounted on the right and left side wall portions of the space 61 at the front side of the controlling space 61, respectively.

As shown in FIGS. 1–3, the inhaled-gas controlling space 61 serves as an accommodating space for accommodating a hinged door 63, and the hinged door 63 accommodated in the space 61 is of substantially rectangular parallelepipedic shape and is substantially as large as the space 61. It is noted that the hinged door 63 serves also as a lid member. The hinged door 63 is rotatably mounted on the right and left side wall portions through the pair of right and left shafts 64a, 64b, so that the hinged door 63 can be swung on the pair of right and left shafts 64a, 64b from its closed position shown in FIGS. 1–3 to its most opened position. The door 63 can be swung toward its closed position, too.

As shown in FIGS. 1 and 2, a recess 65 is formed to a little right of the center of the front surface of the hinged door 63 and in the upper portion thereof. Within the recess 65, an operating lever 67 is rotatably mounted on the right and left side walls of the recess 65 through spindle 69. An elastically engaged portion 67a of the operating lever 67 is elastically and selectively engaged with the U-shaped engaging bar 62 of the base 1. Thus, the locking device that retains the hinged door 63 in its closed position comprises the elastically engaged portion 67a of the operating lever 67 and the U-shaped engaging bar 62 of the base 1.

As shown in FIGS. 1–3, a pair of right and left outside-air inlets 71a, 71b are formed in the lower part of the front surface of the hinged door 63. A transparent window plate 73 is fixed to a front opening provided in the hinged door 63 and a holder carrying filter 75 is removably mounted and faces a rear opening 74, so that it is possible to watch always from the outside through the transparent window plate 73 how the air filter mounted on the holder carrying filter 75 is stained.

Figure 4:
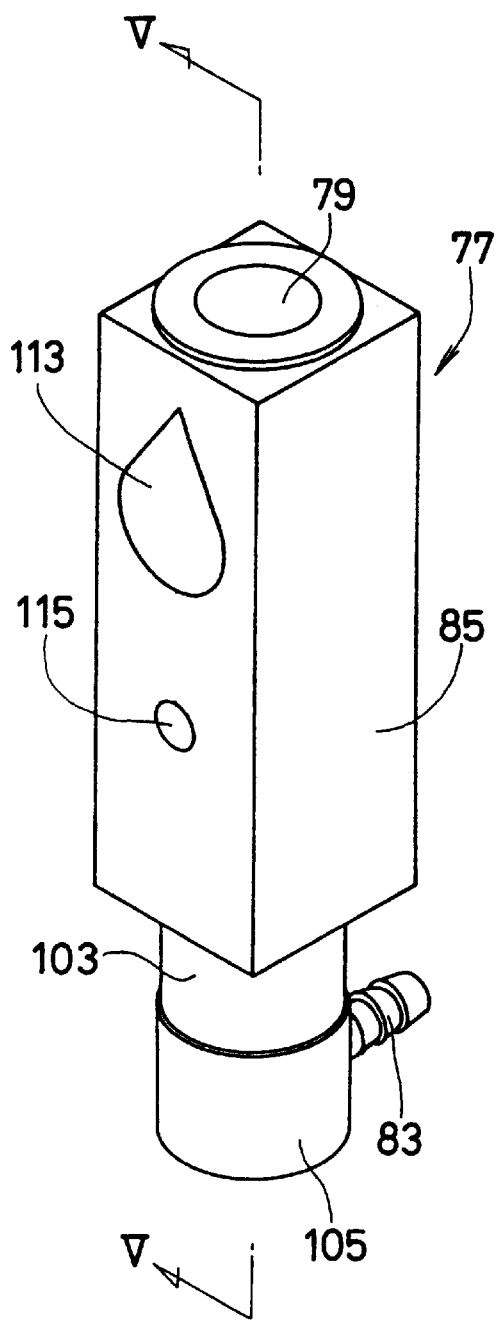
FIG. 4 is a perspective view of the fluid flow controlling device shown in FIG. 3.
Figure 5:
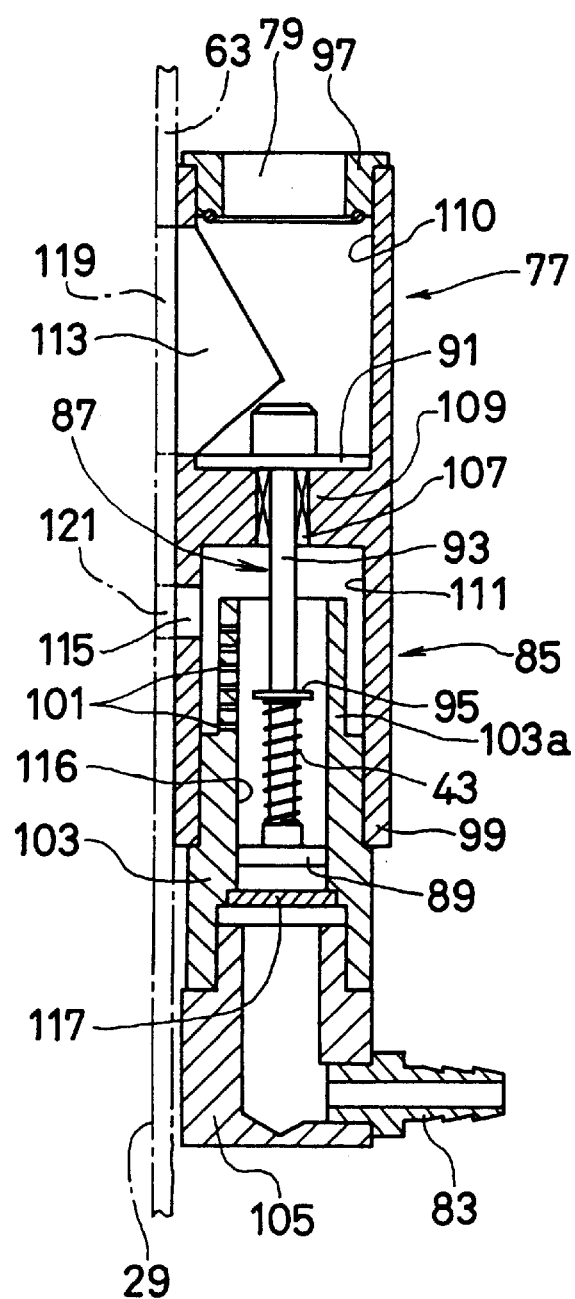
FIG. 5 is a sectional view taken along the line V—V on FIG. 4, at the time when the flow of the supplied oxygen is 0 lit/min.
Figure 10:
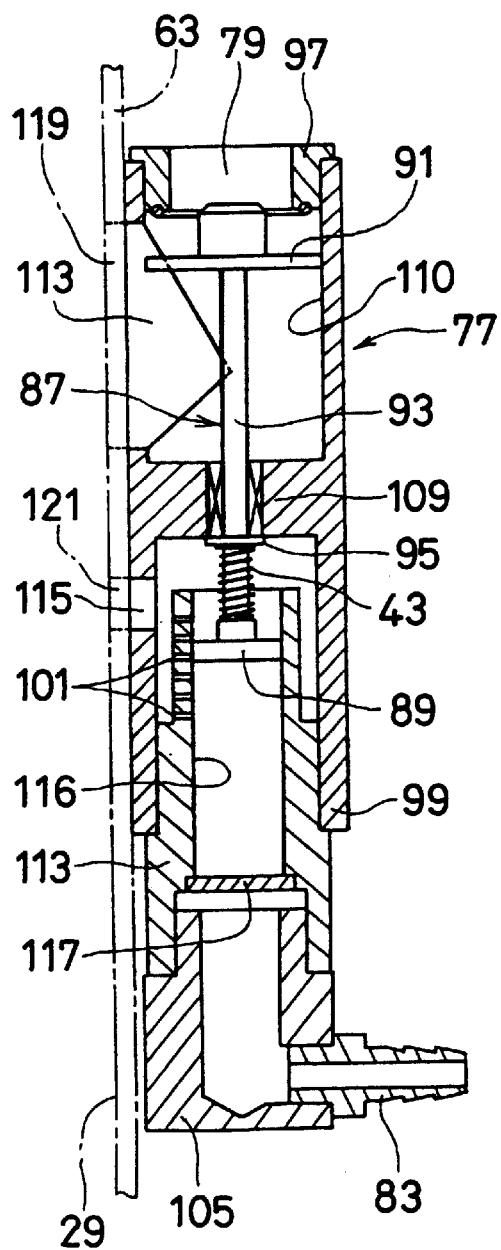
FIG. 10 is a sectional view similar to FIG. 5, at the time when the flow of the supplied oxygen is 5 lit/min.
Figure 11:
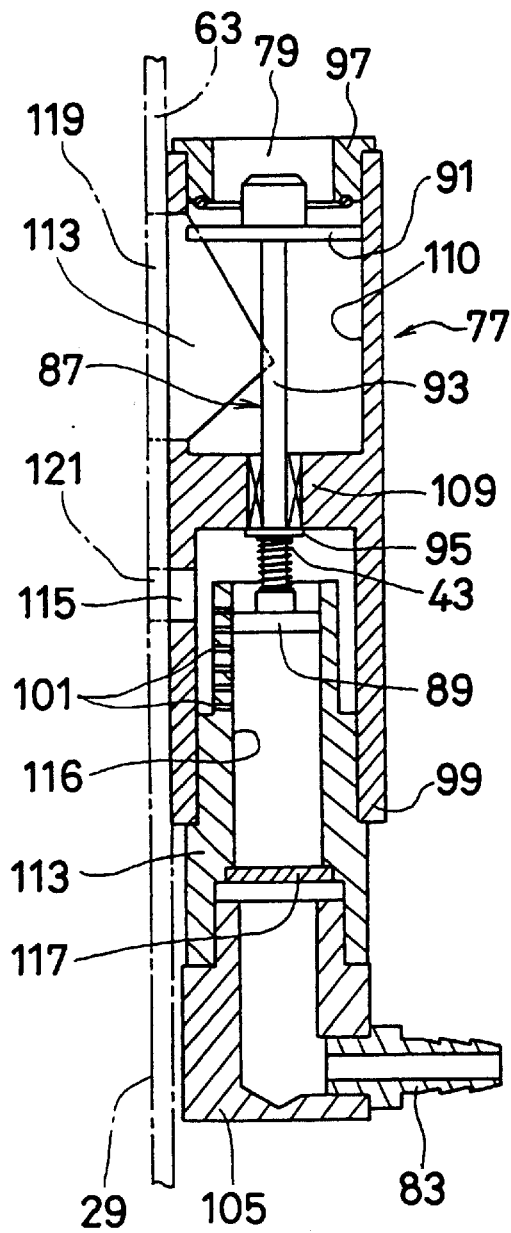
FIG. 11 is a sectional view similar to FIG. 5, at the time when the flow of the supplied oxygen is 6 lit/min.

As shown in FIGS. 1 and 3, a fluid flow controlling device 77, which serves as the inhaled gas controlling device, is mounted on the left-side wall portion of the hinged door 63. As shown in FIGS. 4 and 5, the controlling device 77 has a cylindrical or tubular case 85, in which the air inlet 79 and the base portion of a connecting pipe 83 are disposed at its upper end and its lower end, respectively; and a working member 87 that reciprocates up and down in correspondence with the variable pressure of the supplied oxygen supplied through the oxygen supplying pipe 81 which is connected to the connecting pipe 83. The working member 87 has a pressure detecting plate 89, which serves as a piston member and goes up when the pressure of the supplied oxygen increases; the valve element 91, which changes the opening of the air inlet 79 in correspondence with the varying position of the pressure detecting plate 89 and, thereby, controls the taken-in quantity of the air; a valve spindle 93, which connects the valve element 91 to the pressure detecting plate 89; and a spring seat 95, which is attached to the valve spindle 93. Between the spring seat 95 and the pressure detecting plate 89, a coiled spring 43 lies.

The cylindrical case 85 has a case body portion 99, to the upper end of which a valve seat member 97 with the air inlet 79 is fixedly secured; a cylinder portion 103, whose upper end is fixed to the lower end of the case body 99 and which has plenty of inside oxygen outlets 101 arranged vertically in a line; and an oxygen inhaling pipe portion 105, the upper end of which is fitted into the lower end of the cylinder portion 103 to be fixed and on the lower end of which the connecting pipe 83 is mounted. In a narrow part 109 of the case body portion 99, a thrust bearing 107 is fitted in to support the valve spindle 93 and to let it reciprocate in the axial direction of the case body portion 99, and the narrow part 109 and the thrust bearing 107 partitions the inner space of the case body portion 99 into an upper space 110 and a lower space 111. Further, a single air outlet 113 is provided in the side wall of the upper space 110 of the case body portion 99, and an outside oxygen outlet 115 is provided in the side wall of the lower space 111 of the case body portion 99, so that the plenty of inside oxygen outlets 101 provided in the cylinder portion 103 communicate with the outside oxygen outlet 115 via the lower space 111. The upper part 103a of the cylinder portion 103 is thin and small in diameter to form the inside oxygen outlets 101.

As shown in FIG. 4, the air inlet 79 and the outside oxygen outlet 115 are of circular shape and, also, each inside oxygen outlet 101 is of circular shape. However, the air outlet 113 has an inverse tear-drop form as shown in FIG. 4: that is, the form of a combination of a substantially isosceles triangular shape of its upper part and a substantially semicircular shape of its lower part.

An oxygen filter 117 formed of a unwoven fabric pad or the like is provided in the end of the bore 116 of the cylinder portion 103, and the narrow part 109 of the case body portion 99 serves as a lower limit stopper of the valve element 91 for the outside air lest the pressure detecting plate 89 should abut the oxygen filter 117 at the time when the working member 87 reaches its maximum lower position. It is noted that the outside air passing through the air inlet 79 is the outside air that flows into the inside of the hinged door 63 through the air inlets 71a, 71b.

In the left side wall portion of the hinged door 63, an air inhaling opening 119 and an oxygen inhaling opening 121, which respectively supply the outside air and the supplied oxygen led into the cylindrical case 85 to the pre-filter chamber 29, are provided in correspondence with the air outlet 113 and the outside oxygen outlet 115, respectively. It is noted that the air inhaling opening 119 is substantially the same in shape as the air outlet 113 and the oxygen inhaling opening 121 is substantially the same in shape as the outside oxygen outlet 115. As shown in FIG. 2, disposed on the lower left side of the front portion of the hinged door 63 is a cuplike recess 123, in the bottom surface of which the connecting pipe 39, to which the distal end of the oxygen supplying pipe 81 is connected, is fixed and, to the connecting pipe 39, the distal end of a outside oxygen supplying pipe (not shown) for supplying the supplied oxygen from an oxygen supply source (not shown) such as an oxygen cylinder, an oxygen bomb, or an oxygen tank is connected. As shown in FIG. 3, the distal end of the connecting pipe 39 is substantially flush with the front surface of the hinged door 63, so that it never occurs that the connecting pipe 39 is caught by any outside object.

When the filter mounting apparatus shown in FIGS. 1–5, in which the fluid flow controlling device 77 is incorporated, is used in a state of ordinary use, the air circulating fan (not shown) of the conditioned-air supplying device, which is provided within the base 1, should be driven and the valve of the oxygen supply source (not shown) should be opened in a suitable degree. As the result, the supplied oxygen from the oxygen supply source, whose quantity depends upon the degree of the valve opening, is led into the oxygen inhaling pipe portion 105 of the cylindrical case 85 of the flow controlling device 77 through the outside oxygen supplying pipe (not shown), the outside connecting pipe 39, the inside oxygen supplying pipe 81, and the inside connecting pipe 83. Simultaneously, the outside air, whose quantity depends upon that of the supplied oxygen (they are substantially in reverse relation to each other), is led into the upper space 110 of the case body portion 99 of the cylindrical case 85 through the air inlet 79. Thereafter, the supplied oxygen is led into the pre-filter chamber 29 through the inside oxygen outlets 101, the outside oxygen outlet 115, and the oxygen inhaling opening 121, and the outside air is also led into the pre-filter chamber 29 through the air outlet 113 and the air inhaling opening 119, so that the supplied oxygen and the outside air are mixed with each other in the pre-filter chamber 29. Then, the air within the pre-filter chamber 29, which is enriched with the oxygen in a suitable degree, flows into the post-filter chamber (not shown) through the air filter incorporated in the filter device 75 and moves toward the air circulating fan (not shown), so that the air is purified by the air filter.

When the filter mounting apparatus is used in such a condition that the neonate is in an abnormal state, it is sufficient if the supplied oxygen is supplied to the oxygen inhaling pipe portion 105 of the cylindrical case 85 over a predetermined quantity. In that event, the valve element 91 of the flow controlling device 77 blocks the air inlet 79 completely, so that only the supplied oxygen can be led into the pre-filter chamber 29.

When the air filter incorporated in the holder carrying filter 75 is to be exchanged, it is sufficient if the operating lever 67 is rotated forwards about the spindle 69 after the finger was engaged with the operating lever 67 in the state shown in FIGS. 1–3. As the result, the elastically engaged portion 67a of the operating lever 67 is disengaged from the U-shaped engaging portion 62, so that it becomes possible to grip the operation lever 67 by the hand and to swing the whole of the hinged door 63 forwards about the shafts 64a, 64b.

The function of the fluid flow controlling device 77 will be hereinafter described in detail on reference to FIGS. 5–14 and 19.

(1) When the flow of the supplied oxygen (hereinafter described as "the supply oxygen flow") led into the oxygen inhaling pipe portion 105 of the cylindrical case 85 is 0 lit/min, the valve element 91 abuts against the narrow part 109 of the case body portion 99, so that the air inlet 79 and the air outlet 113 are fully opened as shown in FIGS. 5 and 14A, and the inside oxygen outlets 101 of the cylinder portion 103 does not communicate with the inside of the oxygen inhaling pipe portion 105 by the pressure detecting plate 89. Thus, the gas supplied to the pre-filter chamber 29 (hereinafter described as "the supply air") is composed of 19.2 lit/min of the outside air and 0 lit/min of the supplied oxygen.

(2) When the supply oxygen flow is 1 lit/min, the pressure of the supplied oxygen is exerted on the pressure detecting plate 89, so that the working member 87 rises as shown in FIG. 6. Thus, only the lowermost inside oxygen outlet 101 communicates with the inside of the oxygen inhaling pipe portion 105 due to the pressure detecting plate 89 and, in the air outlet 113, only its upper isosceles triangular portion is opened in relation to the air inlet 79 as shown in FIG. 14B, so that the supplied gas is composed of 14.3 lit/min of the outside air and 1 lit/min of the supplied oxygen.

(3) When the flow of the supplied oxygen is increased, in turn, to 2 lit/min, 3 lit/min, 4 lit/min, 5 lit/min and 6 lit/min, the working member 87 moves in turn as shown in FIGS. 7, 8, 9, 10 and 11. Thus, the inside of the oxygen inhaling pipe portion 105 communicates with the lowermost inside oxygen outlet 101 on the occasion of the flow of 2 lit/min; with the inside oxygen outlets 101 by the second from underneath on the occasion of the flow of 3 lit/min and 4 lit/min; with the inside oxygen outlets 101 by the third from underneath on the occasion of the flow of 5 lit/min; and with the inside oxygen outlets 101 by the fourth from underneath on the occasion of the flow of 6 lit/min. Further, the opening of the isosceles triangular portion of the air outlet 113 is reduced in turn as shown in FIGS. 14C, 14D, 14E, 14F and 14G in relation to the air inlet 79. Thus, the supplied gas is composed, in turn, of 8.3 lit/min of the outside air and 2 lit/min of the supplied oxygen; 5.6 lit/min of the outside air and 3 lit/min of the supplied oxygen; 2.5 lit/min of the outside air and 4 lit/min of the supplied oxygen; 0.7 lit/min of the outside air and 5 lit/min of the supplied oxygen; and 0 lit/min of the outside air and 6 lit/min of the supplied oxygen.

Figure 12:
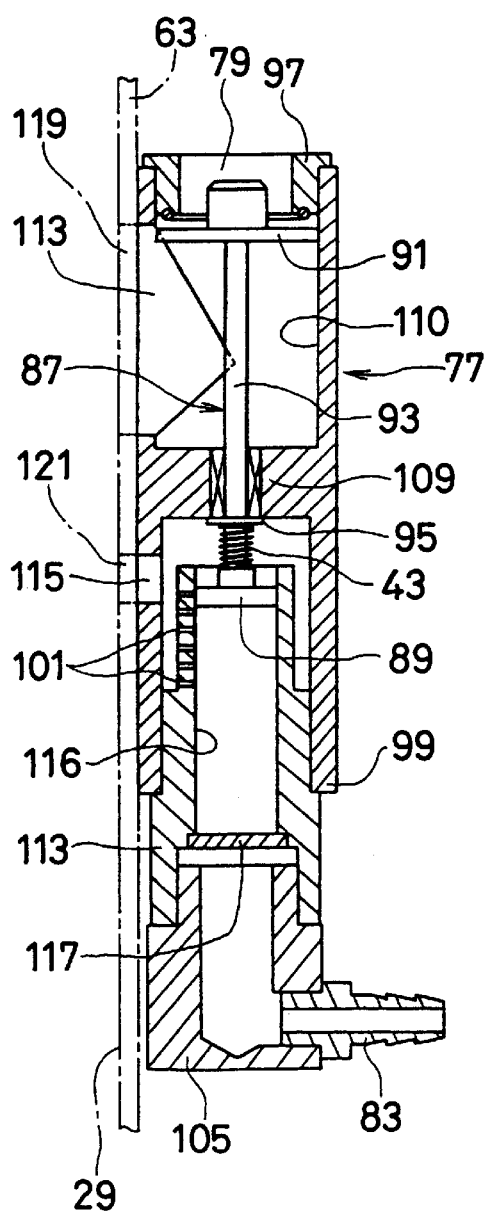
FIG. 12 is a sectional view similar to FIG. 5, at the time when the flow of the supplied oxygen is 7 lit/min.
Figure 13:
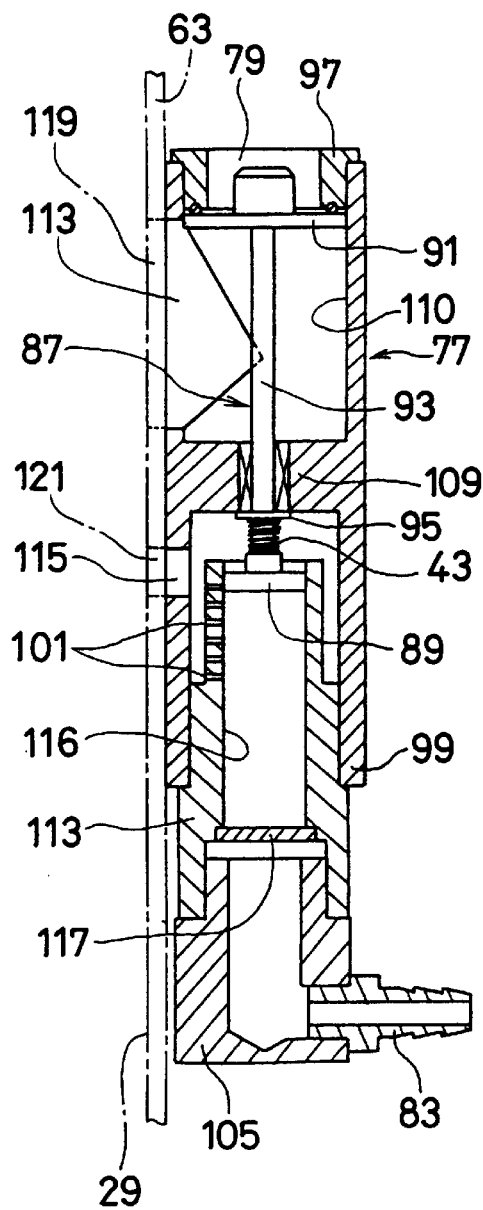
FIG. 13 is a sectional view similar to FIG. 5, at the time when the flow of the supplied oxygen is 8 lit/min.
Figure 15:
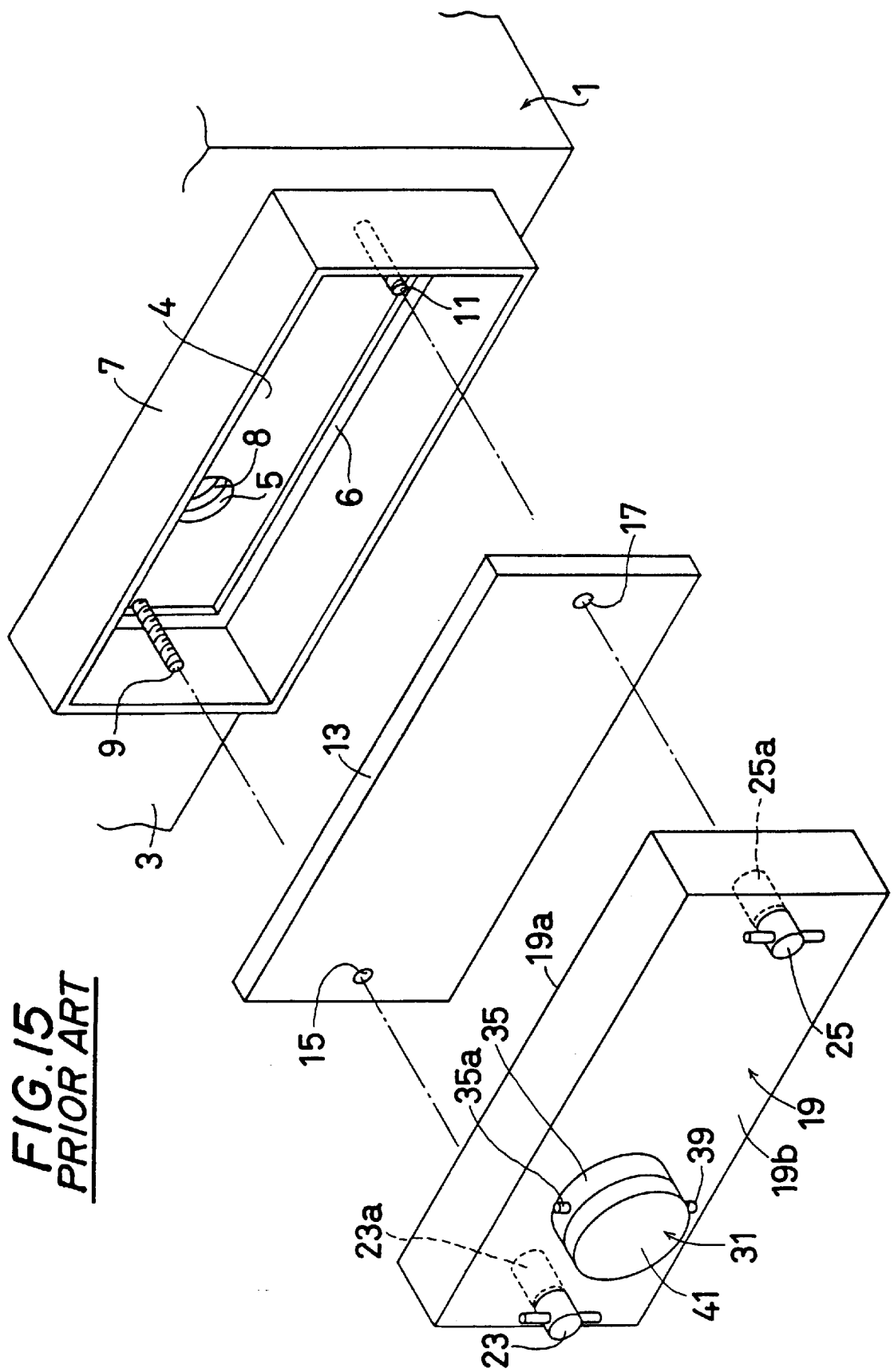
FIG. 15 is an exploded, perspective view illustrating a filter mounting apparatus of an incubator in which a first former example of conventional fluid flow controlling devices is incorporated.
Figure 16:
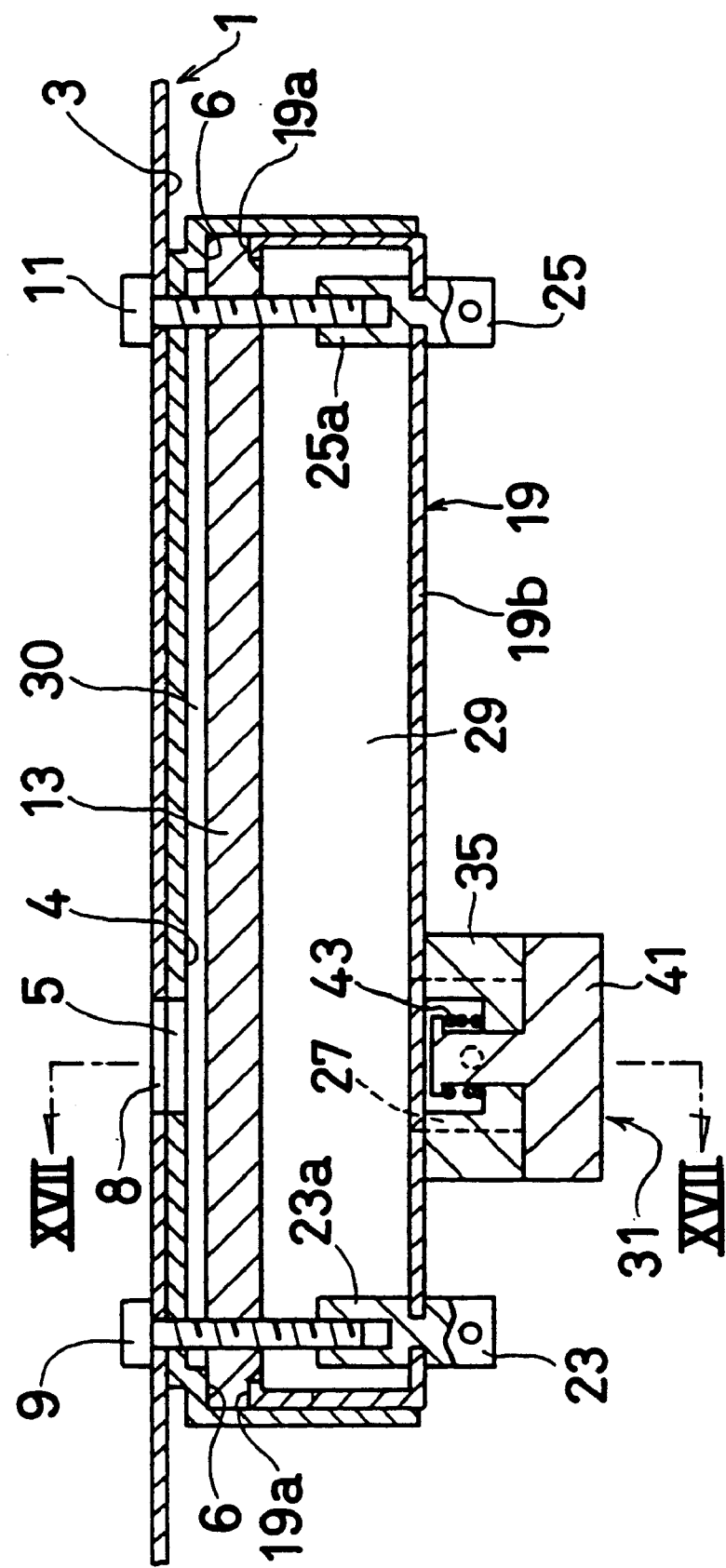
FIG. 16 is a lateral sectional view, sectional along the center line, of the filter mounting apparatus shown in FIG. 15.
Figure 17A:
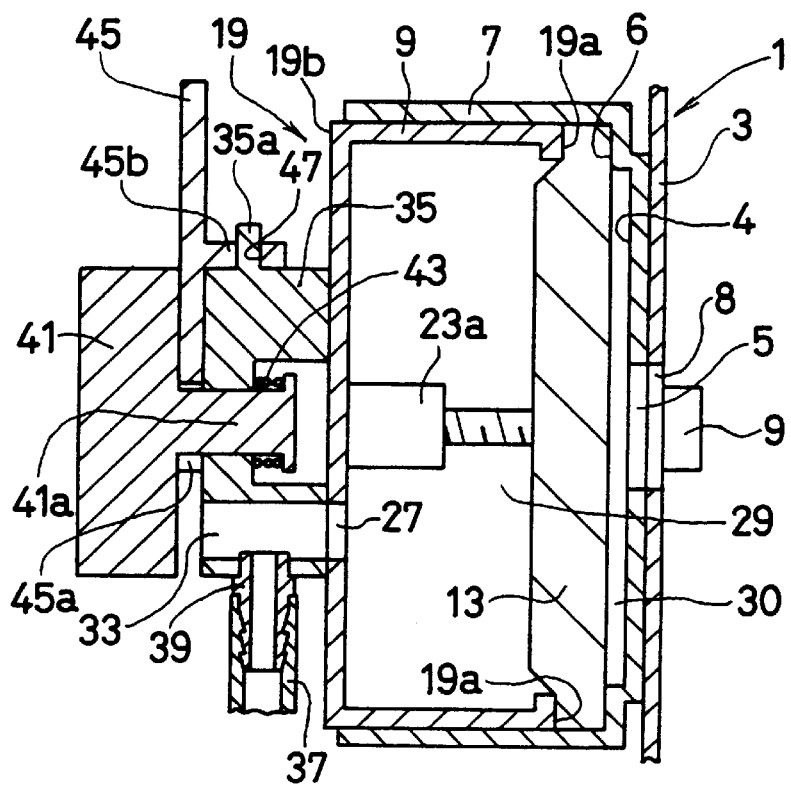
FIG. 17A is a sectional view taken along the line XVII—XVII on FIG. 16, the device being in the state of ordinary use.
Figure 17B:
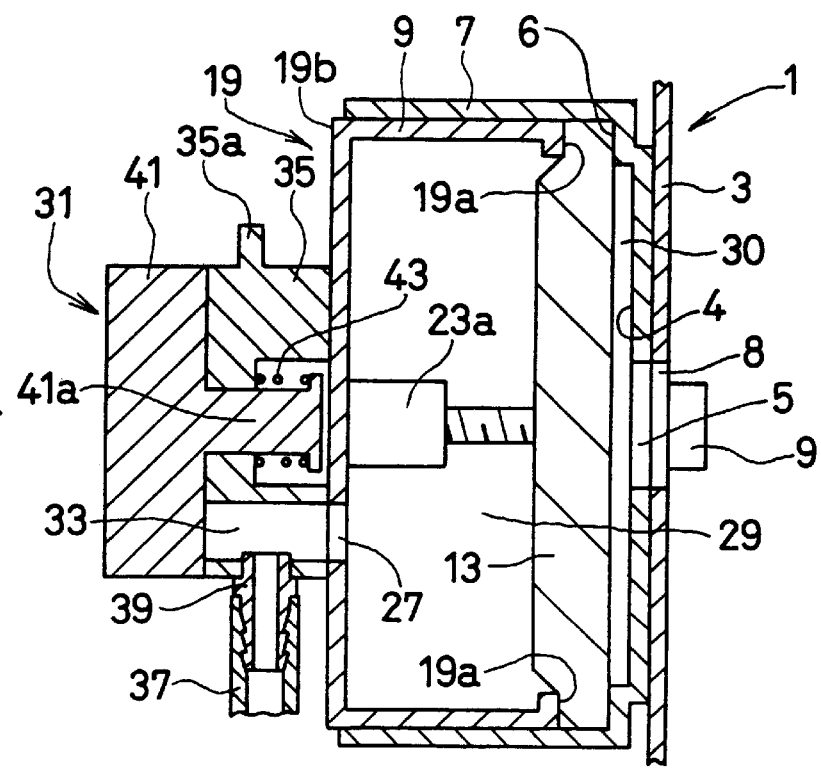
FIG. 17B is a sectional view similar to FIG. 17A, the device being in the state of extraordinary use.
Figure 18A:
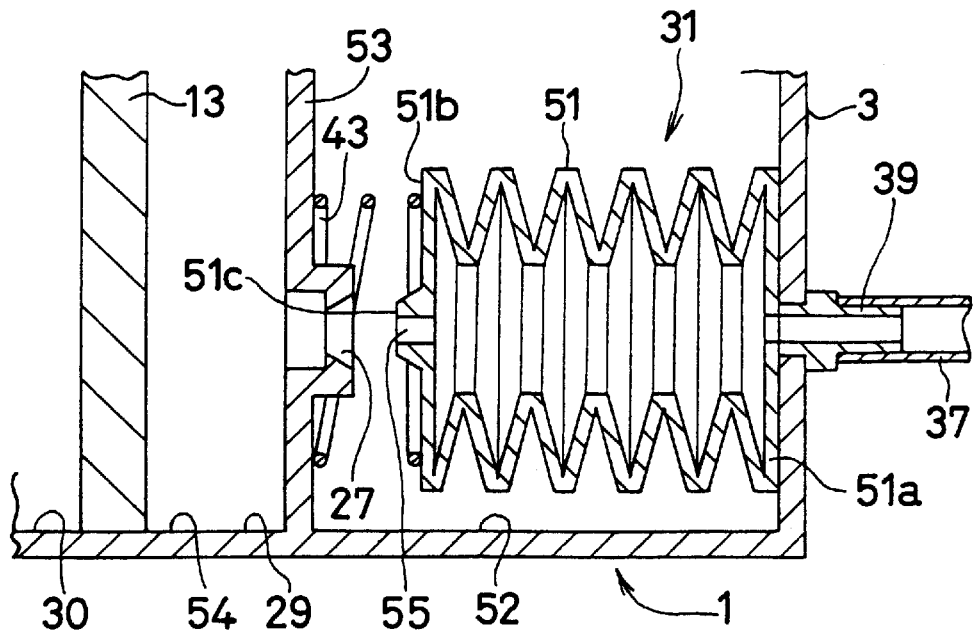
FIG. 18A is a lateral sectional view illustrating a second former example of conventional fluid flow controlling devices, which is disposed adjacent to the filter mounting apparatus of an incubator and is in the state of ordinary use.
Figure 18B:
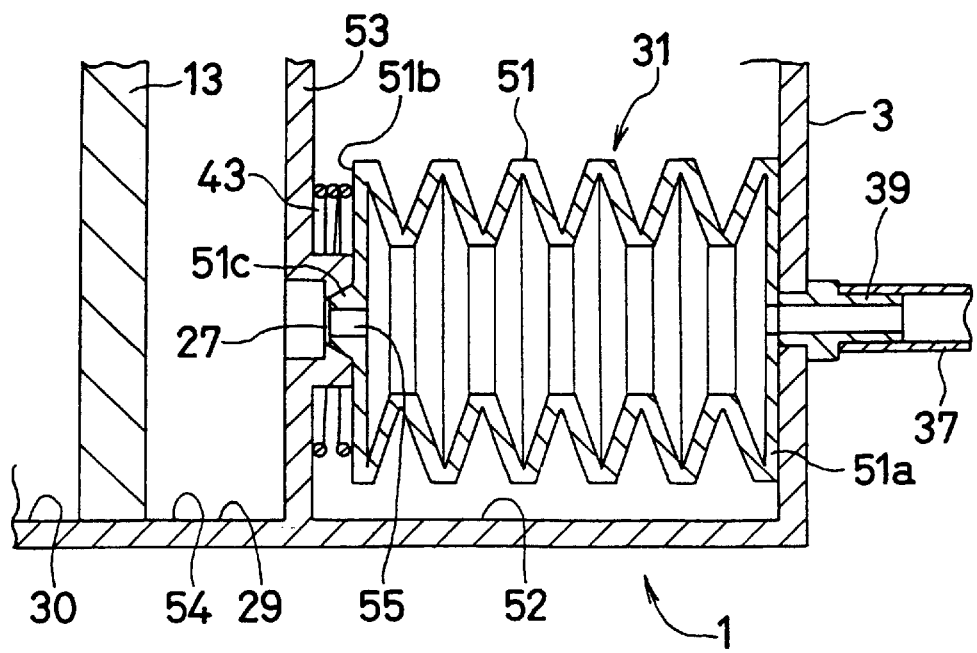
FIG. 18B is a lateral sectional view similar to FIG. 18A, the device being in the state of extraordinary use.

(4) When the supply oxygen flow is further increased to 7 lit/min or 8 lit/min, the working member 87 moves forwards in a position shown in FIG. 12 or 13, respectively. Lastly, the valve element 91 of the working member 87 moves from the position shown in FIG. 14H to the position shown in FIG. 14I and abuts against the valve seat member 97, so that the air inlet 79 is completely closed. At that time, the inside of the oxygen inhaling pipe portion 105 communicates with the inside oxygen outlets 101 by the fifth from underneath due to the pressure detecting plate 89. Thus, the supplied gas is composed, in turn, of 0 lit/min of the outside air and 7 lit/min of the supplied oxygen; and 0 lit/min of the outside air and 8 lit/min of the supplied oxygen and, if the supply oxygen flow is further increased over 8 lit/min, the supplied gas is composed of only the increasing supplied oxygen.

As described in Items (1)–(4), it is possible to change the flow rate of the oxygen and the outside air of the supplied gas in correspondence with the supply oxygen flow by the use of the fluid flow controlling device 77. In this connection, the oxygen and the outside air of the supplied gas are substantially in reverse proportion to each other, so that it is possible to change substantially linearly the concentration of the oxygen in the hood of the incubator, between about 20% to about 90% on the supplied oxygen as represented a broken line C in FIG. 19.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

In the above-mentioned embodiment, the present invention is applied, in one instance, to the fluid flow controlling device of an incubator, but can be applied to any of other medical appliances than the incubator or other kinds of machines and instruments.

Moreover, in the above-mentioned embodiment, this invention is put to controlling the air flow and the supplied oxygen flow, but this invention is put to controlling the other gas flows, mist containing gas flows, or any of the other fluid flows.

Moreover, in the above-mentioned embodiment, the inside oxygen outlet 101 does not communicate with the inside of the oxygen inhaling pipe portion 105 until the working member 87 moves forwards by about 60% of its whole stroke but, from the standpoint of preventing it from erroneous working, it is preferable that the inside oxygen outlet 101 does not communicate with the inside of the oxygen inhaling pipe portion 105 until the working member 87 moves by a previously selected value from in range of from 30 to 80%, preferably by a previously selected value from in range of from 45 to 70%, of its whole stroke.

Moreover, in the above-mentioned embodiment, the plenty of inside oxygen outlets 101 are arranged in a line along the axial direction of the working member 87 but they can be arranged aslant of the axial direction and that not only in a line but also in plural lines. Further, if the opening of the inside oxygen outlet 101 to the inside of the oxygen inhaling pipe portion 105 increases as the pressure detecting plate 89 moves forwards, the inside oxygen outlet 101 may be of a single slit-like shape, and the slit-like outlet may extend along the axial direction of the working member 87 or aslant of the axial direction.

Moreover, in the above-mentioned inside comment, the inside connecting pipe 83 and the outside connecting pipe 39 are provided individually, but if the inside connecting pipe 83 is made to have also the function of the outside connecting pipe 39 and arranged in the position of the outside connecting pipe 39 shown in FIG. 3, the outside connecting pipe 39 and the oxygen supplying pipe 81 can be omitted.

Moreover, in the above-mentioned embodiment, the plenty of inside oxygen outlets 101 and the single outside oxygen outlet 115 are provided as the outlet for flowing the supplied oxygen outside from the cylindrical case 85, but it is possible to form the cylinder portion 103 integrally with the case body portion 99 and to provide the plenty of oxygen outlets 101 in the integrated case body portion 99. Thus, the outside oxygen outlet 115 can be omitted.

We claim:

1. A fluid flow controlling device comprising a tubular case and a working member capable of reciprocating in said tubular case, said tubular case having a first inlet for leading a first fluid into said tubular case; a second inlet for leading a second fluid into said tubular case; a first outlet for flowing said first fluid, which is led into said tubular case from said first inlet, outside from said tubular case; and a second outlet for flowing said second fluid, which is led into said tubular case from said second inlet, outside from said tubular case, and said working member comprising a pressure detecting portion to detect the pressure of said second fluid, which flows into said tubular case through said second inlet, and to displace said working member in relation to the pressure of said second fluid; and a valve element to decrease the opening of said first outlet in relation to the opening of said first inlet in correspondence with the displacement of said working member, such that said second fluid, which is led into said tubular case through said second inlet, is led outside through said second outlet, and said first fluid, which is led into said tubular case through said first inlet, is led outside through said first outlet under condition such that the flow of said first fluid through said first outlet is inversely related to the flow of said second fluid through said second outlet.

2. A fluid flow controlling device according to claim 1, wherein:

a part of said first outlet proximate said first inlet is substantially of triangular shape so that the opening of said first outlet may be decreased by said valve element at the rate larger than that inversely proportional to the displacement of said working member.

3. A fluid flow controlling device according to claim 2, wherein:

said first outlet is substantially of a shape comprising, the substantially triangular shape on the first inlet side and, a substantially semicircular shape on the side away from the first inlet.

4. A fluid flow controlling device according to claim 1, further comprising:

a filter chamber in which said first fluid flowed outside through said first outlet and said second fluid flowed outside through said second outlet are mixed with each other.

5. A fluid flow controlling device according to claim 1, wherein:

the opening of said second outlet in relation to the opening of said second inlet increases with the increase in the displacement of said pressure detecting portion.

6. A fluid flow controlling device according to claim 5, wherein:

said second outlet communicates with said second inlet after the working member moves by a previously selected value from in a range of from about 30 to 80% of its whole stroke, whereby said second fluid within said tubular case does not flow outside through said second outlet.

7. A fluid flow controlling device according to claim 5, wherein:

said second outlet communicates with said second inlet after the working member moves by a previously selected value from in a range of from about 45 to 70% of its whole stroke, whereby said second fluid within said tubular case does not flow outside through said second outlet.

8. A fluid flow controlling device according to claim 1, wherein:

said working member comprises said pressure detecting portion serving as a piston member which is movable forwards when the pressure of said second fluid is exerted; said valve element for controlling the inhaled quantity of said first fluid by means of varying the opening of said first outlet in relation to the opening of said first inlet in correspondence with the displacement of said pressure detecting portion; and a valve spindle which connects said valve element to said pressure detecting portion.

9. A fluid flow controlling device according to claim 8, wherein:

said tubular case comprises a case body, at one end of which said first inlet is provided; a cylinder portion, to one end of which the other end of said case body is fixed by fit; and said second fluid inhaling pipe portion, to one end of which the other end of said cylinder portion is fixed by fit, and said second outlet comprises a plurality of outlets that are formed at said cylinder portion and at least in a line along the axial direction thereof.

10. A fluid flow controlling device according to claim 9, wherein:

said valve spindle is guided by the narrow part formed in said case body and moves along the axial direction thereof; and the inside space of said tubular case is divided, by said narrow part, into one space for said first fluid and another space for said second fluid.

11. A fluid flow controlling device according to claim 1, wherein:

said first fluid is the outside air and said second fluid is the oxygen supplied from an oxygen supply source.

12. An incubator, wherein:

said tubular case of the fluid flow controlling device according to any one of claims 1–11 is mounted on an incubator base, whereby said fluid flow controlling device is incorporated in an incubator base.

* * * * *